Jan. 16, 1962     L. J. EMENAKER     3,017,593

POTENTIOMETER APPARATUS

Filed Feb. 23, 1960

LEO J. EMENAKER
*INVENTOR.*

BY Byard G. Nilsson

United States Patent Office 3,017,593
Patented Jan. 16, 1962

3,017,593
POTENTIOMETER APPARATUS
Leo J. Emenaker, Playa del Rey, Calif., assignor to The Bendix Corporation, a corporation of Delaware
Filed Feb. 23, 1960, Ser. No. 10,356
4 Claims. (Cl. 338—143)

The present invention relates to a potentiometer apparatus for providing an electrical signal indicative of the angular position of a rotary shaft.

Recent developments in the field of automatic control have increased the need for various potentiometer devices. One device of this type, which is in common use, employs a coiled resistance connected across a source of electrical potential so that each point along the resistance provides a different voltage. Various wiper-contact arrangements are then incorporated in the device to contact the resistance element at a different point according to the position of a shaft which is connected to the device.

Potentiometer devices of the type considered above will normally accommodate a rotating shaft through several revolutions while providing a continuously-varying electrical signal. Usually, the number of revolutions through which the potentiometer functions coincide to the number of turns in the coiled resistance element. In theory, the number of turns which could be provided in a coil is not limited; however, potentiometers capable of functioning through a great many revolutions would be very expensive and large. Therefore, prior devices have usually accommodated only a limited number of revolutions and included either a brake or a clutch arrangement to operate when the shaft exceeded the range of the potentiometer.

Potentiometer devices are sometimes employed in conjunction will rotative shafts which are capable of exerting tremendous force. Often in such applications, the brake employed in a potentiometer cannot hold the shaft, resulting in loss of signal reference and sometimes damage to the unit.

Potentiometer devices which employ a clutch to disengage the movable element in the potentiometer from a rotative shaft, are sometimes unsatisfactory because when the clutch operates, the angular relationship between the potentiometer and the associated shaft is lost.

In view of the above considerations, it is apparent that a need exists for an improved potentiometer device which includes a coiled element with a limited number of turns, which element may function in conjunction with a movable contact to derive an electrical signal indicative of the position of the shaft and wherein apparatus is provided to accommodate the unlimited angular movement of the shaft, without loss of the angular relationship to the potentiometer.

In general, the present invention comprises a potentiometer apparatus as described above, incorporating at least one track positioned adjacent the end of the coil element, which track receives and carries the movable element when this element moves off the coil. Furthermore, the track may operate with a counter for indicating the extent of shaft movement beyond the range of the potentiometer.

This structure of the invention, and objects thereof will become apparent from a consideration of the following description, taken in conjunction with the drawing, in which.

Figure 1:
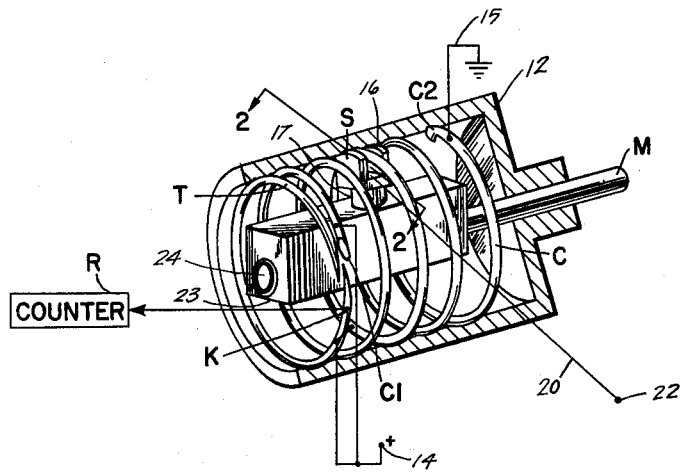
FIGURE 1 is a sectionalized perspective and diagrammatic view of an apparatus constructed in accordance with the present invention.

Referring now to FIGURE 1, there is shown a coiled conductor C (formed of resistance material) which engages and carries a slider S that is variously positioned by a rotatable mechanical shaft M. The conductor C is connected across a source of potential so that voltages of various magnitude are received by the slider S, depending upon its position.

Adjacent one end of the conductor C is an annular track T which receives the slider S, if the shaft M is turned to move the slider off the coiled conductor C. Each revolution of the shaft M during which the slider S rides upon the track T results in the brief closure of contacts K to apply a pulse to the counter R, thereby registering the occurrence of a shaft revolution outside the range of the potentiometer.

Considering the illustrative embodiment of the present invention in greater detail, the coiled conductor C is mounted in a housing 12 formed of insulating material (sectionalized in FIGURE 1).

In one embodiment of the present invention, the coiled conductor C may comprise very small resistance wire wound upon a coil form in the shape of the coiled conductor C. Of course, various forms of the conductor C may be provided in different embodiments of the present invention.

The coiled conductor C and the track T may be variously secured in the cylindrical housing 12 or the housing may be cast about these members. It is to be noted, that the track T may be positioned at either end of the coiled conductor C, or similar tracks may be provided at both ends of the conductor.

The left end $C_1$ of the coiled conductor C is connected to a terminal 14 which is adapted to be connected to a source of positive potential. The right end $C_2$ of the conductor C is connected to ground by a conductor 15.

Figure 2:
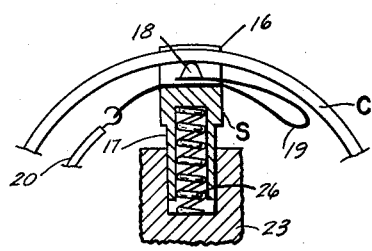
FIGURE 2 is a fragmentary sectional view along line 2—2 of FIGURE 1.
Figure 3:
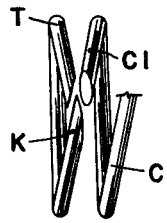
FIGURE 3 is a partial plan view of the coil from the apparatus in FIGURE 1.

The slider S comprises a shaft 17 integrally formed of non-conductive material with a cradle 16 (FIGURE 2) partially surrounding the coiled conductor C. The cradle 16 contains a contact 18 affixed therein which is mounted upon a flat spring 19 so as to be urged against the conductor C. The contact 18 is connected through a conductor 20 to an output terminal 22.

The shaft 17 is rotatably positioned in a lateral bore of a block 23 which is rigidly mounted on the mechanical shaft M by receiving the shaft in an axial bore 24. The hollow shaft 17 contains a coil spring 26 which urges the slider S outwardly from the block 23.

The rotatable shaft M may be connected to various apparatus of which rotational movement is to be observed. In such use, as the shaft M is revolved, various contact points on the coil C are engaged by the contact 18 to provide different voltages at the terminal 22. For example, when the slider S is adjacent the left end $C_1$ of the coiled conductor C, a relatively high voltage is provided (substantially coinciding to the voltage applied at the terminal 14). Of course, the range of signals which may be provided at the terminal 22 is dependent upon the voltage across the conductor C which is in turn somewhat dependent upon the resistance of the coiled conductor C.

If the shaft M is turned in a counter-clockwise direction, while the slider S is positioned at the left end $C_1$ of the conductor C, the slider S is moved off the end $C_1$ of the conductor C onto the track T. Thereafter, each revolution of the shaft M in a counter-clockwise direction simply causes the slider S to revolve upon the track T. However, these revolutions are counted by the counter R upon receiving electrical pulses resulting from the closure of the contacts K by the slider S.

At a time when the shaft M reverses its direction of rotation to a clockwise direction, the slider S is moved from the track T back onto the coiled conductor C. Furthermore, when this occurs, the relationship between the slider S and the mechanical shaft M is precisely the same as existed when the slider was moved off the coiled conductor C. Also, the counter R now provides an indication of the number of revolutions by the shaft M which were outside the range of the coiled conductor C.

It may therefore be seen, that an important feature of the present invention is to provide a potentiometer for use in conjunction with a rotary shaft, which potentiometer does not have a limited range of rotation.

Another important feature of the present invention is to provide a potentiometer apparatus, for use in conjunction with a rotary shaft, which apparatus provides an indication of movement by the shaft beyond the range of the potentiometer apparatus.

Also from the foregoing, it will be apparent that the present invention provides an apparatus capable of many variations and modifications, consequently, the present invention is not to be limited to a particular arrangement as herein shown and described except as defined in the appended claims.

What is claimed is:

1. A potentiomer for use in conjunction with a shaft for providing an analog signal indicative of the angular position of said shaft, comprising: a coiled conductor adapted to be connected across a source of potential; a sliding contact mounted to engage said coiled conductor and adapted to be connected to said shaft whereby to be variously positioned on said conductor; a closed track adjacent an end of said conductor to receive and carry said sliding contact upon said sliding contact moving off said conductor; and contact means on said track for engaging said sliding contact at regular intervals of rotation of said shaft, whereby to form electrical signals indicative of said rotation.

2. A potentiometer for use in conjunction with a shaft for providing an analog signal indicative of the angular position of said shaft, comprising: a coiled conductor adapted to be connected across a source of potential; a contactor element mounted to engage said coiled conductor and adapted to be connected to said shaft whereby to be variously positioned on said conductor; a track adjacent at least one end of said conductor to receive and carry said contactor element through a closed path upon said contactor element revolving beyond moving off said conductor; contact means on said track for engaging said contactor element at regular intervals of rotation of said shaft, whereby to form electrical signals indicative of said rotation.

3. A potentiometer for use in conjunction with a shaft for providing an analog signal indicative of the angular position of said shaft, comprising: a coiled conductor including a plurality of turns adapted to be connected across a source of potential; a contact mounted to engage said coiled conductor and adapted to be connected to said shaft whereby to be variously positioned on said conductor by revolving said shaft; and an annular open track of substantially a full turn adjacent an end of said conductor to receive said contact upon said contact moving off said conductor, said track to carry said conductor as said shaft revolves whereby said shaft may revolve through plural revolutions after said contact moves off said conductor.

4. A potentiometer for use in conjunction with a shaft for providing an analog signal indicative of the angular position of said shaft, comprising: a plural-turn coiled resistance conductor adapted to be connected across a source of potential whereby to provide a range of signals at contact points thereon; a slider mounted to engage said coiled conductor and adapted to be connected to said shaft whereby to be variously positioned on said conductor by revolving said shaft; and an open track of substantially a full turn adjacent one end of said conductor to receive and carry said slider as a continuation of said coiled resistance whereby said shaft may revolve through plural revolutions after said track receives said slider, said track being formed to guide said slider back to said coiled resistance upon reversed rotation of said shaft.

References Cited in the file of this patent

UNITED STATES PATENTS 2,908,882    Gottschall              Oct. 13, 1959

FOREIGN PATENTS 681,958    Great Britain            Oct. 29, 1952